US012411908B2

(12) United States Patent
Fujiki

(10) Patent No.: US 12,411,908 B2
(45) Date of Patent: Sep. 9, 2025

(54) DATA MANAGEMENT METHOD FOR SEMICONDUCTOR MANUFACTURING APPARATUS AND CONTROL DEVICE PROVIDED WITH RING BUFFER

(71) Applicant: EBARA CORPORATION, Tokyo (JP)

(72) Inventor: Masayuki Fujiki, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 713 days.

(21) Appl. No.: 17/571,956

(22) Filed: Jan. 10, 2022

(65) Prior Publication Data

US 2022/0221835 A1  Jul. 14, 2022

(30) Foreign Application Priority Data

Jan. 13, 2021  (JP) .................................. 2021-003730

(51) Int. Cl.
*G06F 17/40* (2006.01)
*G05B 19/18* (2006.01)
*G06F 16/23* (2019.01)
*G06F 16/25* (2019.01)

(52) U.S. Cl.
CPC ........... *G06F 17/40* (2013.01); *G05B 19/188* (2013.01); *G06F 16/2379* (2019.01); *G06F 16/254* (2019.01); *G05B 2219/45031* (2013.01)

(58) Field of Classification Search
CPC .... G06F 17/40; G06F 16/2379; G06F 16/254; G05B 19/188; G05B 2219/45031
See application file for complete search history.

(56) References Cited

U.S. PATENT DOCUMENTS

| 6,466,945 B1* | 10/2002 | Goh ....................... G06F 16/25 707/999.102 |
| 7,587,513 B1* | 9/2009 | Maturi .................... G06F 16/22 709/224 |
| 2003/0179377 A1* | 9/2003 | Masaki ............... G03F 7/70891 356/400 |
| 2010/0332615 A1* | 12/2010 | Short ..................... H04L 61/25 709/225 |
| 2018/0059980 A1* | 3/2018 | Takeda .................. G06F 3/0652 |
| 2020/0183375 A1 | 6/2020 | Inoue |

FOREIGN PATENT DOCUMENTS

| JP | 2004-319857 A | 11/2004 | |
| JP | 2004319857 | * 11/2004 | ......... H01L 21/3065 |
| JP | 2020-095343 A | 6/2020 | |

* cited by examiner

*Primary Examiner* — Lisa M Caputo
*Assistant Examiner* — Sharah Zaab
(74) *Attorney, Agent, or Firm* — BakerHostetler

(57) ABSTRACT

Conventionally, in order to hold data with a high sampling rate in a control device, it has been necessary to increase the capacity of ring buffers. A data management method for a semiconductor manufacturing apparatus includes acquiring, by a control device, data related to operation of the semiconductor manufacturing apparatus, identifying, by the control device, first data and second data of the acquired data, writing, by the control device, the first data to a first ring buffer at first temporal granularity and the second data to a second ring buffer at second temporal granularity coarser than the first temporal granularity, and extracting, by a data management device, the first and second data from the first ring buffer and the second ring buffer respectively and storing the first and second data in a database.

10 Claims, 15 Drawing Sheets

Fig. 5

| RING BUFFER (CONVENTIONAL) | | | | |
|---|---|---|---|---|
| DATE AND TIME | D1 | D2 | D3 | |
| 2020/07/22 09:30:11.010 | 510, | 120, | 350, | ... ~t010 |
| 2020/07/22 09:30:11.020 | 310, | 110, | 150, | ... ~t020 |
| 2020/07/22 09:30:11.030 | 210, | 220, | 450, | ... ~t030 |
| ... | ... | ... | ... | ... |
| 2020/07/22 09:30:11.100 | 190, | 290, | 550, | ... ~t100 |
| 2020/07/22 09:30:11.110 | 260, | 230, | 470, | ... ~t110 |

☐ DATA THAT NEED NOT BE RECORDED ORIGINALLY

SECOND RING BUFFER

| DATE AND TIME | D2 | D3 | | | | |
|---|---|---|---|---|---|---|
| 2020/07/22 09:30:11.000 | 120 | 350 | ... ~t000 | | | |
| 2020/07/22 09:30:11.100 | 290 | 550 | ... ~t100 | | | |
| 2020/07/22 09:30:11.200 | 750 | 566 | ... ~t200 | | | |
| 2020/07/22 09:30:11.300 | 450 | 555 | ... | | | |
| 2020/07/22 09:30:11.400 | 731 | 455 | ... | | | |
| 2020/07/22 09:30:11.500 | 650 | 513 | ... | | | |
| 2020/07/22 09:30:11.600 | 633 | 523 | ... | | | |
| ... | ... | ... | | | | |

Fig. 8

RING BUFFER (CONVENTIONAL)

| DATE AND TIME | D1 | D2 | D3 | |
|---|---|---|---|---|
| 2020/07/22 09:30:11.000 | 1, | 120, | 350, | ~t000 |
| 2020/07/22 09:30:11.100 | 2, | 290, | 550, | ~t100 |
| 2020/07/22 09:30:11.200 | 2, | 750, | 566, | ~t200 |
| 2020/07/22 09:30:11.300 | 3, | 450, | 555, | ~t300 |
| 2020/07/22 09:30:11.400 | 3, | 731, | 455, | ~t400 |
| 2020/07/22 09:30:11.411 | 0, | 650, | 532, | ~t411 |
| 2020/07/22 09:30:11.500 | 1, | 650, | 513, | ~t500 |
| 2020/07/22 09:30:11.600 | 1, | 633, | 523, | ~t600 |
| ... | ... | ... | ... | |

☐ DATA THAT NEED NOT BE RECORDED ORIGINALLY

Fig. 9

DATA MANAGEMENT METHOD FOR SEMICONDUCTOR MANUFACTURING APPARATUS AND CONTROL DEVICE PROVIDED WITH RING BUFFER

TECHNICAL FIELD

The present invention relates to a data management method for a semiconductor manufacturing apparatus and a control device provided with a ring buffer.

BACKGROUND ART

Control devices such as PLC (Programmable Logic Controller) are used to control a semiconductor manufacturing apparatus. Each control device is provided with a ring buffer and stores control data for the semiconductor manufacturing apparatus and measured data from various sensors provided in the semiconductor manufacturing apparatus in the ring buffer in chronological order. The data in the ring buffer is retrieved from the ring buffer by an external computer and saved in a storage device of the computer. As related technologies, for example, one disclosed in Patent Literature 1 is known.

CITATION LIST

Patent Literature

PTL 1: Japanese Patent Application Laid-Open No. 2004-319857

SUMMARY OF INVENTION

Technical Problem

For accurate management of operating conditions or the like of each section of the semiconductor manufacturing apparatus, it is desirable to increase a sampling rate of the above-described control data and measured data. However, the capacity of the ring buffer needs to be increased for the control device to hold data with a high sampling rate.

Solution to Problem

[Aspect 1]
According to Aspect 1, a data management method for a semiconductor manufacturing apparatus is provided, the method including acquiring, by a control device, data related to operation of the semiconductor manufacturing apparatus, identifying, by the control device, first data and second data of the acquired data, writing, by the control device, the first data to a first ring buffer at first temporal granularity and the second data to a second ring buffer at second temporal granularity coarser than the first temporal granularity, and extracting, by a data management device, the first and second data from the first ring buffer and the second ring buffer respectively and storing the first and second data in a database.

[Aspect 2]
According to Aspect 2, in the method according to Aspect 1, the first data and the second data are written to the first ring buffer and the second ring buffer periodically at the first temporal granularity and the second temporal granularity respectively.

[Aspect 3]
According to Aspect 3, in the method according to Aspect 1, the second data is written to the second ring buffer only when there is a change in the second data.

[Aspect 4]
According to Aspect 4, in any one of the methods according to Aspects 1 to 3, the step of storing the first and second data in the database includes correcting time information of the second data using time information of the first data as a reference and storing the second data with the corrected time information in the database in association with the first data used as the reference for the time information.

[Aspect 5]
According to Aspect 5, in the method according to Aspect 4, one piece of the second data is associated with a plurality of pieces of the first data.

[Aspect 6]
According to Aspect 6, in any one of the methods according to Aspects 1 to 3, the step of storing the first and second data in the database includes correcting time information of the first data using time information of the second data as a reference and storing the first data with the corrected time information in the database in association with the second data used as the reference for the time information.

[Aspect 7]
According to Aspect 7, in the method according to Aspect 6, a selected one of the plurality of pieces of the first data is associated with one piece of the second data.

[Aspect 8]
According to Aspect 8, in any one of the methods according to Aspects 1 to 7, the first data and the second data are measured data measured by a sensor provided in the semiconductor manufacturing apparatus.

[Aspect 9]
According to Aspect 9, in any one of the methods according to Aspects 1 to 7, the first data is measured data measured by a sensor provided in the semiconductor manufacturing apparatus and the second data is data indicating operation contents of the semiconductor manufacturing apparatus.

[Aspect 10]
According to Aspect 10, a data management method for a semiconductor manufacturing apparatus is provided, the method including acquiring, by a first control device, first data related to operation of the semiconductor manufacturing apparatus, acquiring, by a second control device, second data related to operation of the semiconductor manufacturing apparatus, writing, by the first control device, the first data to a first ring buffer at first temporal granularity, writing, by the second control device, the second data in a second ring buffer at second temporal granularity coarser than the first temporal granularity, extracting, by a data management device, the first and second data from the first ring buffer and the second ring buffer respectively, correcting, by the data management device, time information of the second data using time information of the first data as a reference and storing, by the data management device, the second data with the corrected time information in a database in association with the first data used as a reference for the time information.

[Aspect 11]
According to Aspect 11, a control device connected to a semiconductor manufacturing apparatus is provided, the control device including a first ring buffer and a second ring buffer, in which the control device is configured to acquire data related to operation of the semiconductor manufacturing apparatus, identify first data and second data in the acquired data, write the first data to a first ring buffer at first temporal granularity and write the second data to a second ring buffer at second temporal granularity coarser than the first temporal granularity.

BRIEF DESCRIPTION OF DRAWINGS

FIG. 5 illustrates a conventional example contrasted with FIG. 3 and FIG. 4;

FIG. 6 is a diagram illustrating details of the process in step S204 according to another embodiment of the present invention and illustrating an example of measured data written to the second ring buffer;

FIG. 8 illustrates a conventional example contrasted with FIG. 6 and FIG. 7;

FIG. 9 is a diagram illustrating an example of a process of writing event data to the third ring buffer;

DESCRIPTION OF EMBODIMENTS

Hereinafter, embodiments of the present invention will be described in detail with reference to the accompanying drawings.

Figure 1:
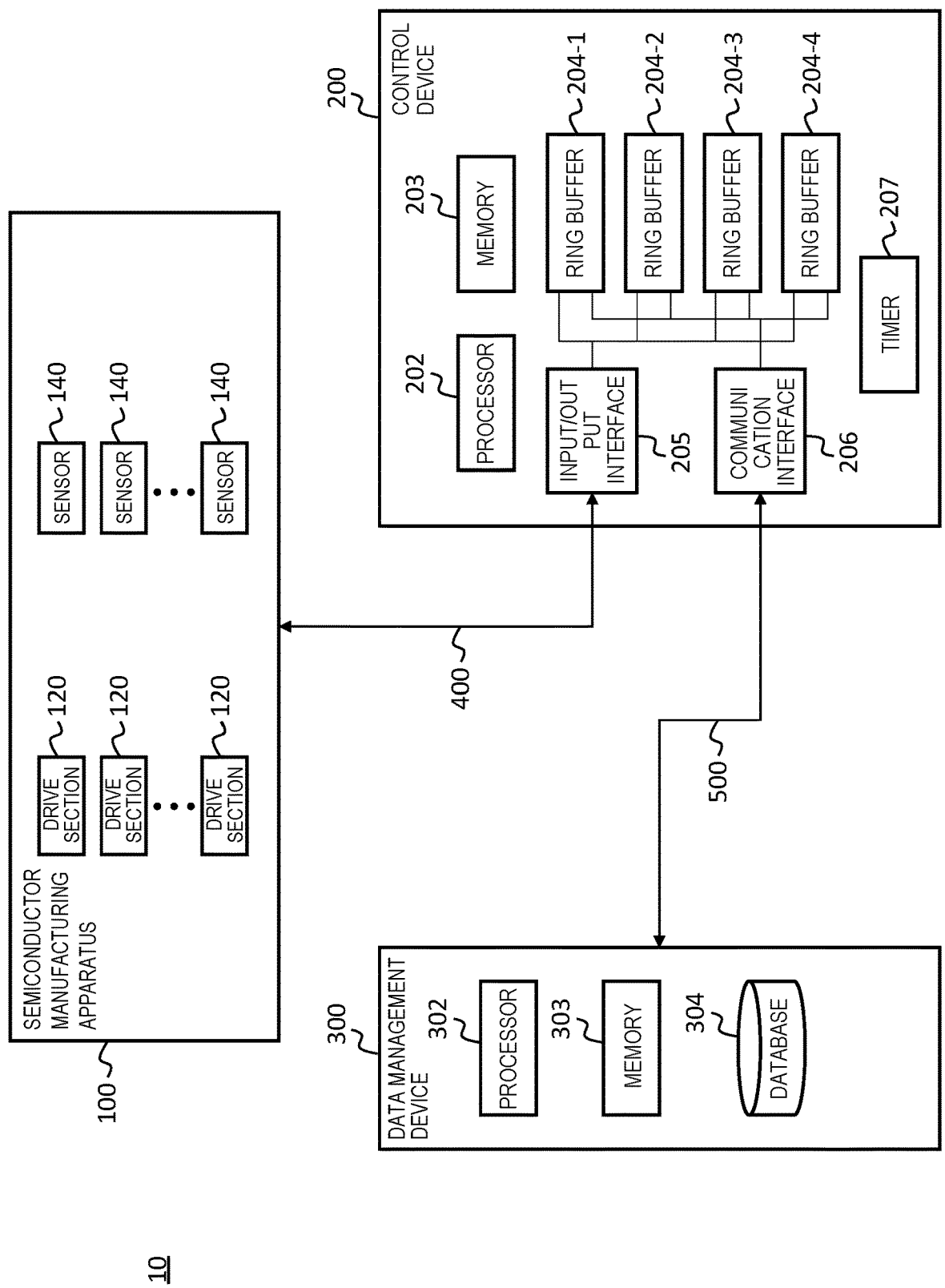
FIG. 1 is a configuration diagram of a system that implements a method according to an embodiment of the present invention.

FIG. 1 is a configuration diagram of a system 10 that implements a method according to an embodiment of the present invention. The system 10 is provided with a semiconductor manufacturing apparatus 100, a control device 200 and a data management device 300. The semiconductor manufacturing apparatus 100 is an apparatus to manufacture a semiconductor product or an intermediate product of the semiconductor product. For example, the semiconductor manufacturing apparatus 100 includes any device involved in manufacturing a semiconductor product such as an electroplating apparatus for plating a substrate (semiconductor substrate or glass substrate or the like), a polishing apparatus (e.g., CMP (Chemical Mechanical Polishing) apparatus) for polishing a substrate or a thin film formed on a substrate, a film forming apparatus (e.g., CVD (Chemical Vapor Deposition) apparatus or a vapor deposition apparatus) for forming a thin film on a substrate, an exposure apparatus for transferring a fine pattern to a thin film on a substrate, an etching apparatus for micromachining a substrate or a thin film on a substrate by etching, an ion implantation apparatus for implanting ions into a substrate or a thin film on a substrate, a dicing apparatus for cutting a substrate into chips, various inspection apparatuses (or measurement apparatuses) for inspecting a final semiconductor product or intermediate product (including substrate).

The semiconductor manufacturing apparatus 100 is provided with a plurality of drive sections 120, operations of which are controlled by the control device 200 during operation of the semiconductor manufacturing apparatus 100. For example, if the semiconductor manufacturing apparatus 100 is an electroplating apparatus, the drive section 120 includes a transfer device or a transfer robot 120 for transferring a substrate, a chemical supply device 120 for supplying predetermined chemical to each bath such as a plating bath, a plurality of valves 120 that open/close a supply pipe of each chemical, a power supply device (rectifier or the like) 120 that supplies a current for electrolytic reaction to a substrate immersed in a plating solution in a plating bath, a temperature control device 120 that controls temperature of the plating solution in the plating bath and other devices/mechanisms (e.g., alarm device) 120. On the other hand, for example, if the semiconductor manufacturing apparatus 100 is a CMP device, the drive section 120 includes a motor 120 for rotating a substrate and a polishing pad, an opening/closing valve 120 for a pipe that supplies a polishing liquid to a polishing pad, a substrate transfer robot 120 and other devices/mechanisms 120. These are nothing but specific examples of some of many drive sections 120 provided in the semiconductor manufacturing apparatus 100. The semiconductor manufacturing apparatus 100 may be provided with any number of drive sections 120 of any appropriate type.

The semiconductor manufacturing apparatus 100 is further provided with a plurality of sensors 140. The plurality of sensors 140 are installed at predetermined locations of the semiconductor manufacturing apparatus 100. The sensor 140 may be, for example, a temperature sensor, a flow rate sensor, a pressure sensor, a concentration sensor, a torque meter and a rotation speed meter for measuring the torque and the number of revolutions of a motor, an ammeter, a voltmeter or the like. Each sensor 140 is installed at each drive section 120 of the semiconductor manufacturing apparatus 100, and measures each predetermined physical quantity and outputs the measured value.

The control device 200 is a device that controls and manages operation of the semiconductor manufacturing apparatus 100. For example, a PLC (Programmable Logic Controller) can be preferably used as the control device 200, but the control device 200 can be another type of computer. In the system 10 in FIG. 1, the control device 200 is connected to each drive section 120 and each sensor 140 of the semiconductor manufacturing apparatus 100 via communication wiring 400. The control device 200 may be assembled in the semiconductor manufacturing apparatus 100 as part of the configuration of the semiconductor manufacturing apparatus 100.

Note that although only one control device 200 is shown in FIG. 1, the system 10 may be provided with a plurality of control devices 200. An embodiment in which the system 10 is provided with the plurality of control devices 200 will be described later with reference to FIG. 14 or the like.

The control device 200 is provided with a processor 202, a memory for program storage 203, a plurality of ring buffers 204-1 to 204-4, an input/output interface 205, a communication interface 206 and a timer 207. A program for implementing the method (or part of the method) according to the embodiment of the present invention is stored in the memory 203. The processor 202 reads and executes the program from the memory 203. Thus, the control device 200 can implement the method (or part of the method) according to the embodiment of the present invention.

The processor 202 of the control device 200 outputs an operation instruction to each drive section 120 of the semiconductor manufacturing apparatus 100 via the input/output interface 205. According to this operation instruction, each drive section 120 of the semiconductor manufacturing apparatus 100 performs a predetermined operation. The processor 202 of the control device 200 acquires a measured value measured by each sensor 140 from each sensor 140 of the semiconductor manufacturing apparatus 100 via the input/output interface 205 and writes data with the acquired measured value to each of the ring buffers 204-1 to 204-4.

Furthermore, in the system 10 in FIG. 1, the control device 200 is connected to the data management device 300 via a network 500 such as a LAN (local area network) or the Internet. The control device 200 can communicate with the data management device 300 via the communication interface 206.

In the system 10 of the present embodiment, the data management device 300 is a device that has a role of managing data related to operation of the semiconductor manufacturing apparatus 100. The data management device 300 may be, for example, a computer provided with a data server function. The data management device 300 is provided with a processor 302, a memory for program storage 303 and a database 304. A program for implementing the method (or part of the method) according to the embodiment of the present invention is stored in the memory 303. The processor 302 reads and executes a program from the memory 303. Thus, the data management device 300 can implement the method (or part of the method) according to the embodiment of the present invention.

Figure 2:
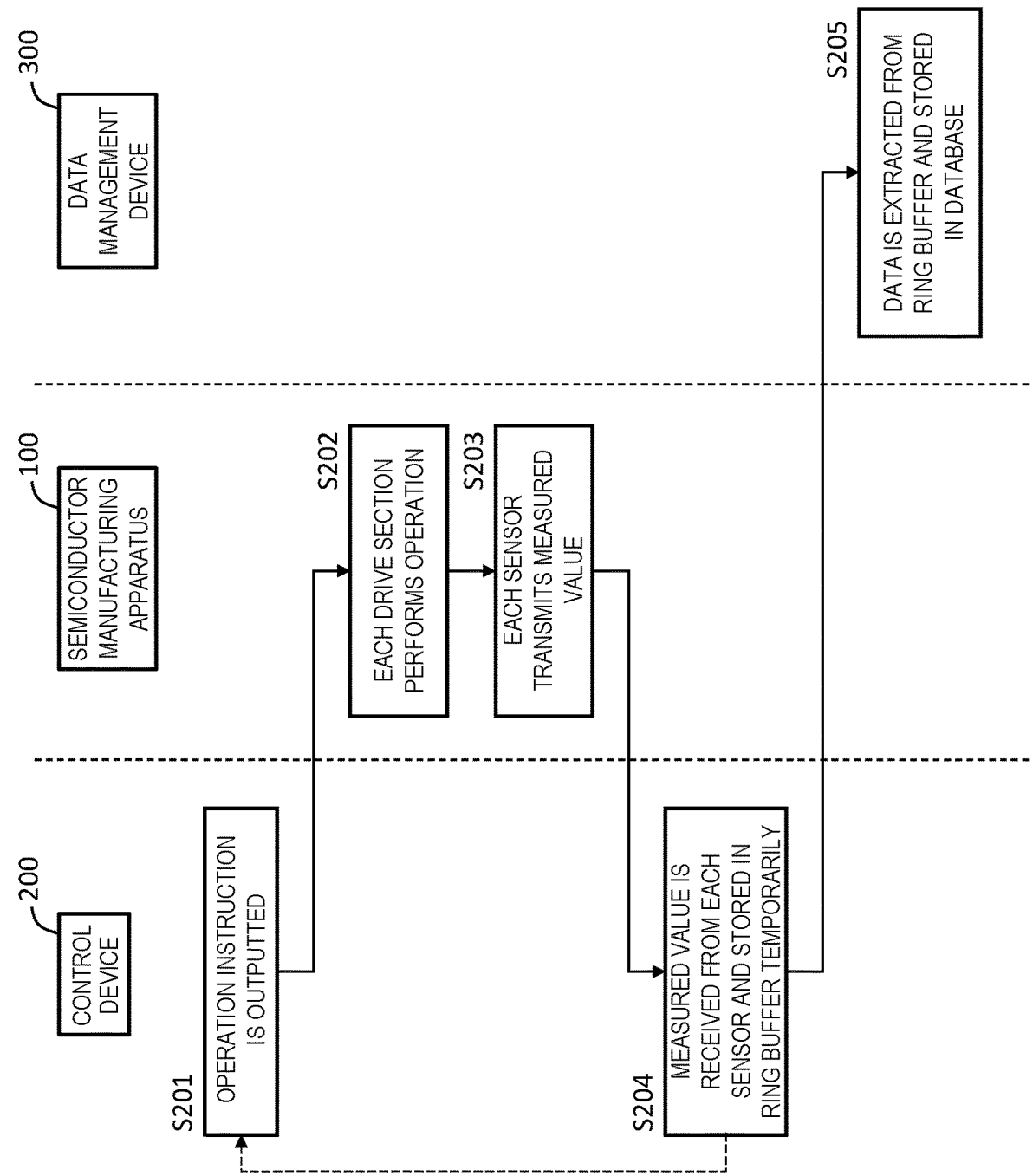
FIG. 2 is a flowchart illustrating an overall outline of a process to implement the method according to the embodiment of the present invention.

FIG. 2 is a flowchart illustrating an overall outline of a process to implement the method according to the embodiment of the present invention. The processing of the present embodiment includes operations of the semiconductor manufacturing apparatus 100, the control device 200 and the data management device 300.

First, in step S201, the control device 200 outputs a predetermined operation instruction to each drive section 120 of the semiconductor manufacturing apparatus 100. In step S202, each drive section 120 of the semiconductor manufacturing apparatus 100 performs a predetermined operation according to an operation instruction instructed by the control device 200. In step S203, each sensor 140 of the semiconductor manufacturing apparatus 100 measures data and transmits the measured value to the control device 200.

In step S204, the control device 200 receives the measured values transmitted from each sensor 140 of the semiconductor manufacturing apparatus 100 and temporarily stores the measured values in the ring buffers 204-1 to 204-4. After step S204, steps S201 to S204 are repeated again at predetermined time intervals.

In step S205, the data management device 300 extracts data from the ring buffers 204-1 to 204-4 of the control device 200 and stores the data in the database 304. In this way, data related to operation of the semiconductor manufacturing apparatus 100 is accumulated in the database 304 of the data management device 300. The data stored in the database 304 may then be used in the data management device 300 for purposes such as, displaying the data on a monitor screen for an administrator of the system 10 to check the operational status (e.g., occurrence of trouble) of the semiconductor manufacturing apparatus 100 or further analyzing the operational status of the semiconductor manufacturing apparatus 100 (e.g., statistical process).

Figure 3:
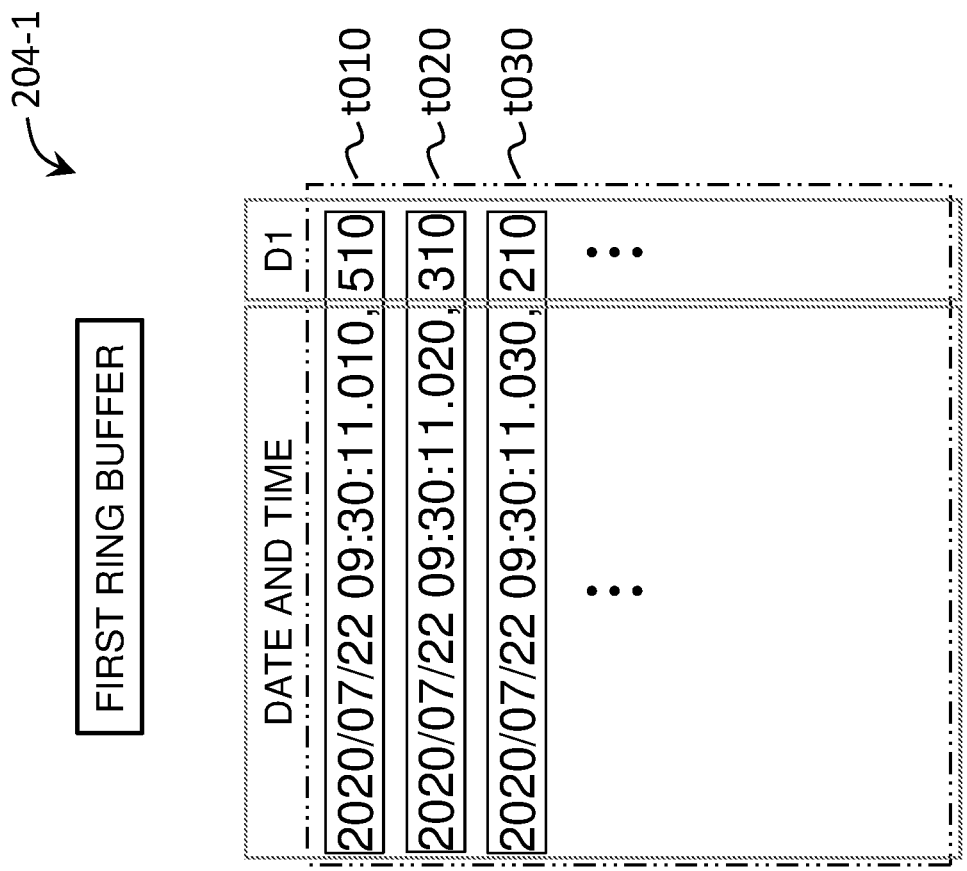
FIG. 3 is a diagram illustrating details of a process in step S204 according to the embodiment of the present invention and illustrating an example of high speed sampling data written to a first ring buffer.
Figure 4:
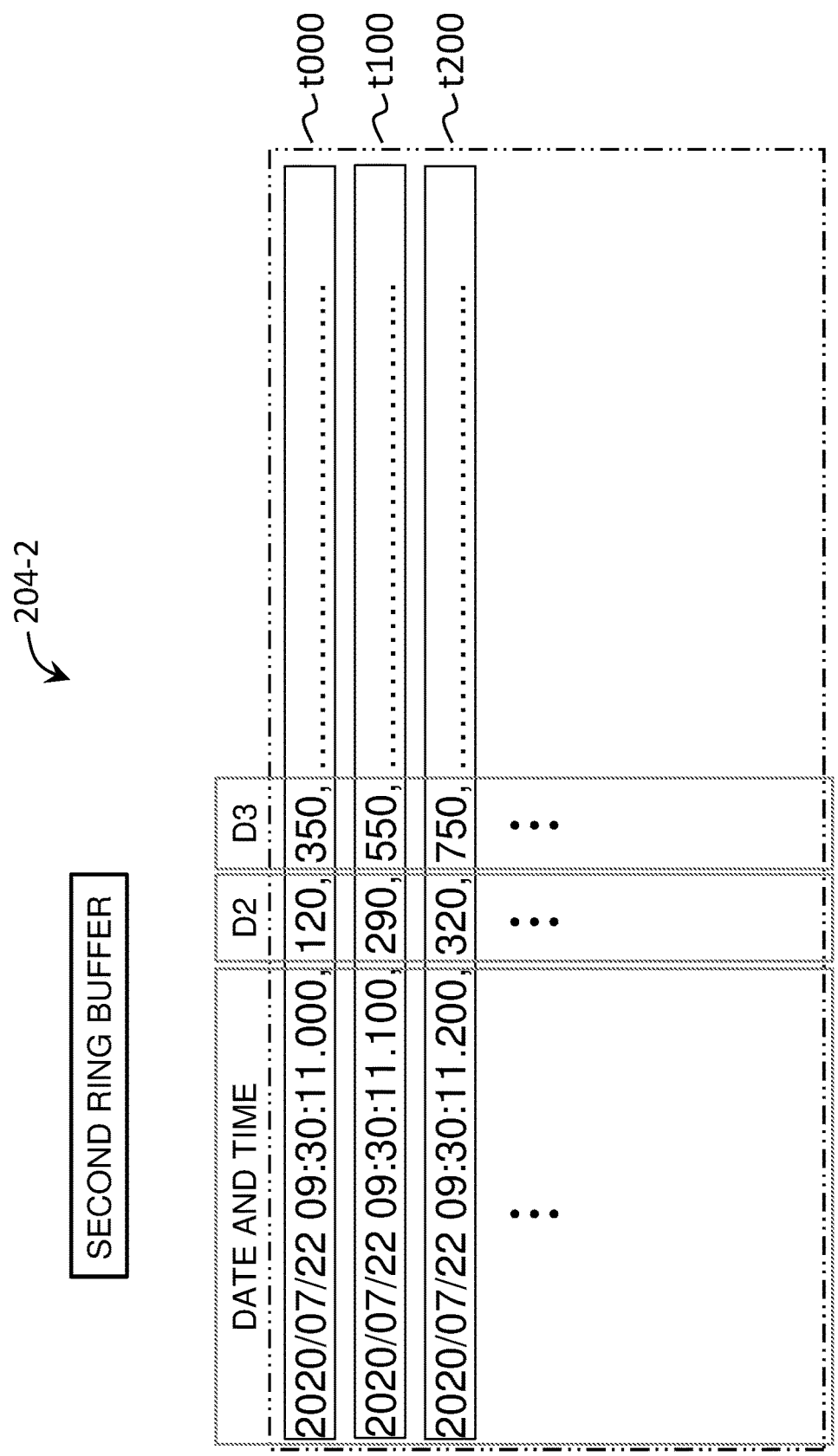
FIG. 4 is a diagram illustrating details of the process in step S204 according to the embodiment of the present invention and illustrating an example of low speed sampling data written to a second ring buffer.

FIG. 3 and FIG. 4 are diagrams illustrating details of the process in above-described step S204 according to the embodiment of the present invention. In the present embodiment, the control device 200 holds data that needs to be recorded with a high sampling rate (hereinafter referred to as "high speed sampling data") of the measured values obtained from each sensor 140 in the first ring buffer 204-1, on one hand, and holds data for which recording at a low sampling rate is sufficient (hereinafter referred to as "low speed sampling data") in the second ring buffer 204-2, on the other hand.

Whether the measured value of each sensor 140 is high speed sampling data or low speed sampling data may be, for example, determined in advance by the administrator of the system 10 and may be set in the control device 200. For example, the high speed sampling data may be data that directly indicates the operational status of the drive section 120 of the semiconductor manufacturing apparatus 100 (e.g., the torque and the number of revolutions of a motor, position information or speed information on a transfer device, a current value and a voltage value of each circuit or the like). The low speed sampling data may be data of an environment that changes by being indirectly affected by operation of the drive section 120 of the semiconductor manufacturing apparatus 100 (e.g., temperature, pressure, concentration, flow rate or the like).

In step S204, the processor 202 of the control device 200 classifies each sensor 140 of the semiconductor manufacturing apparatus 100 into a sensor 140 corresponding to the high speed sampling data and a sensor 140 corresponding to the low speed sampling data. This classification can be performed based on, for example, information set by the administrator of the system 10. The processor 202 acquires measured data from the sensor 140 corresponding to the high speed sampling data and writes the measured data to the first ring buffer 204-1 at first temporal granularity and acquires measured data from the sensor 140 corresponding to the low speed sampling data and writes the measured data in the second ring buffer 204-2 at second temporal granularity. Furthermore, when writing the measured data to each ring buffer, the processor 202 acquires date and time information (the time of writing) from the timer 207 and stores the date and time information in the ring buffer in association with the measured data.

The first temporal granularity may be, for example, a 10-millisecond time interval. On the other hand, the second temporal granularity may be temporal granularity coarser than the first temporal granularity, for example, a 100-millisecond time interval. That is, the processor 202 in this example writes the high speed sampling data to the first ring buffer 204-1 once every 10 milliseconds and writes the low speed sampling data to the second ring buffer 204-2 once every 100 milliseconds. Note that numerical values of these time intervals (10 milliseconds, 100 milliseconds) are nothing but examples, and it goes without saying that the numerical values of these time intervals can be changed as appropriate.

FIG. 3 illustrates an example of high speed sampling data written to the first ring buffer 204-1. In FIG. 3, measured data D1 is acquired from a predetermined sensor (sensor corresponding to the high speed sampling data) of the plurality of sensors 140 of the semiconductor manufacturing apparatus 100 periodically at times t010, t020, t030, . . . and written to the first ring buffer 204-1. Times t010, t020, t030, . . . correspond to a 10-millisecond interval. Each measured data D1 is stored in association with date and time information indicating respective writing times.

On the other hand, FIG. 4 illustrates an example of low speed sampling data written to the second ring buffer 204-2. In FIG. 4, measured data D2 and D3 are acquired from a predetermined sensor (sensor corresponding to the low speed sampling data) of the plurality of sensors 140 of the semiconductor manufacturing apparatus 100 periodically at times t000, t100, t200, . . . and written to the second ring buffer 204-2 together with date and time information. Times t000, t000, t200, . . . correspond to a 100-millisecond interval. Note that when there are a plurality of pieces of data (D2, D3) as in this example, the plurality of pieces of data are written to the ring buffer together as one set of data.

Here, the present embodiment is contrasted with a conventional example. FIG. 5 illustrates a conventional example in which all the measured data acquired from the plurality of sensors 140 of the semiconductor manufacturing apparatus 100 are written to one ring buffer. As shown in FIG. 5, the measured data D1, D2 and D3 are acquired from the sensor 140 corresponding to the respective data at each of the times t010, t020, t030, . . . , t100, t110, . . . with a 10-millisecond interval and written to one and the same ring buffer. When only one ring buffer is used in this way, all the data (D1, D2, D3) are acquired from each sensor and written collectively to the ring buffer (similar to data D2. D3 in the example in FIG. 4).

In the example in FIG. 5, if the measured data D1 is data that needs to be recorded with a high sampling rate (once every 10 milliseconds) and the measured data D2 and D3 are data for which recording at a low sampling rate (e.g., every 100 milliseconds) is sufficient, the measured data D2 and D3 at times t010, t020, t030, t110 or the like are data that need not be recorded originally. However, because of the need to record the measured data D1 once every 10 milliseconds, the measured data D2 and D3 also need to be written to the ring buffer at the same cycle as the measured data D1. Thus, in the conventional example, the ring buffer is required to have a buffer size larger than the actual buffer size required so as to be able to hold data that need not be recorded originally.

On the other hand, in the present embodiment, only high speed sampling data (e.g., D1) having the first temporal granularity (e.g., 10-millisecond time interval) is written to the first ring buffer 204-1, whereas low speed sampling data (e.g., D2, D3) having second temporal granularity (e.g., 100-millisecond time interval) coarser than the first temporal granularity are written to the second ring buffer 204-2. For this reason, it is sufficient for the first ring buffer 204-1 to have a buffer size necessary to hold only the high speed sampling data (e.g., D1) with the first temporal granularity. On the other hand, since the second ring buffer 204-2 holds data with coarse temporal granularity, the buffer size can be small. Therefore, according to the present embodiment, it is possible to reduce the overall buffer size of the ring buffer (total buffer size of the first ring buffer 204-1 and the second ring buffer 204-2).

Figure 7:
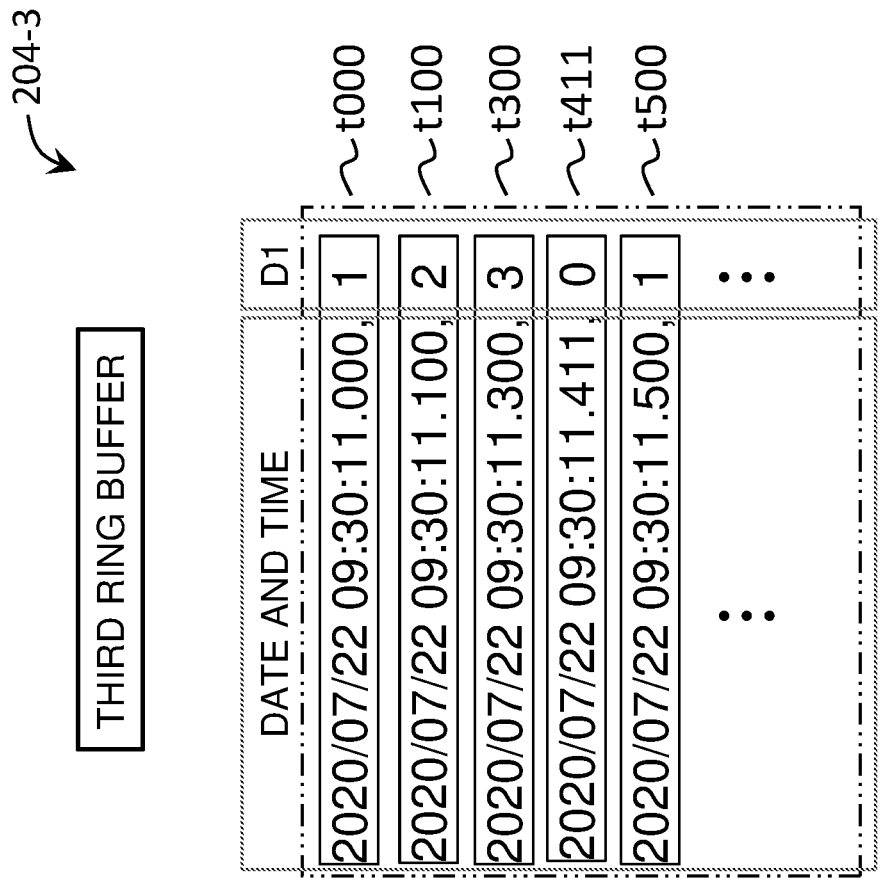
FIG. 7 is a diagram illustrating details of the process in step S204 according to another embodiment of the present invention and illustrating an example of event data written to a third ring buffer.

FIG. 6 and FIG. 7 are diagrams illustrating details of the process in above-described step S204 according to another embodiment of the present invention. In the present embodiment, the control device 200 holds measured data obtained from the sensor 140 of the semiconductor manufacturing apparatus 100 in the second ring buffer 204-2 and "event data" in the third ring buffer 204-3. Note that the measured data from the sensor 140 may be held in the first ring buffer 204-1 instead of the second ring buffer 204-2.

Here, the event data is data included in an operation instruction sent from the control device 200 to the semiconductor manufacturing apparatus 100 in aforementioned step S201 in FIG. 2, and is information that specifies the process to be performed by the semiconductor manufacturing apparatus 100 and an object to be processed. For example, when the semiconductor manufacturing apparatus 100 is an electroplating device, the event data includes a step number that identifies a step in a recipe that specifies contents of a series of plating processes made up of a plurality of steps, a work number that identifies a substrate (or a cassette that stores a plurality of substrates) subject to electroplating.

In step S204 of the flowchart in FIG. 2, the processor 202 of the control device 200 acquires measured data from the sensor 140 of the semiconductor manufacturing apparatus 100 at the first temporal granularity, writes the measured data to the second ring buffer 204-2 (or the first ring buffer 204-1) on one hand, and writes event data to the third ring buffer 204-3 at the second temporal granularity. Note that the event data can be extracted from the operation instruction generated by the processor 202 in step S201. When writing the measured data and the event data to the ring buffer, the processor 202 stores each data in the ring buffer in association with date and time information (the time of writing) from the timer 207.

The first temporal granularity in the present embodiment may be, for example, a 100-millisecond time interval (or any time interval, for example, several hundreds of milliseconds or less). On the other hand, the second temporal granularity may be, for example, granularity indicated by timing at which the event data changes. Since the event data normally changes (e.g., change in the step number of a recipe or the work number) at a frequency of once every several seconds to every several hundreds of seconds, the second temporal granularity is temporal granularity coarser than the first temporal granularity. That is, in this example, the processor 202 writes measured data from the sensor 140 to the second ring buffer 204-2 once every 100 milliseconds and writes the event data to the third ring buffer 204-3 at timing at which the event data changes.

FIG. 6 illustrates an example of the measured data written to the second ring buffer 204-2. In FIG. 6, measured data D2 and D3 are acquired from a predetermined sensor among the plurality of sensors 140 of the semiconductor manufacturing apparatus 100 periodically at times t000, t100, t200, . . . and written to the second ring buffer 204-2. Times t000, t100, t200, . . . correspond to a 100-millisecond interval.

On the other hand, FIG. 7 illustrates an example of the event data written to the third ring buffer 204-3. In FIG. 7, the event data D1 changes at times t000, t100, t300, t411, t500, . . . and the event data D1 is written to the third ring buffer 204-3 aperiodically at these timings.

FIG. 8 is a diagram illustrating a conventional example contrasted with the embodiment in FIGS. 6 and 7, and illustrates an example in which all the measured data and event data are written to one ring buffer. As shown in FIG. 8, the event data D1 and the measured data D2 and D3 are written to the one and the same ring buffer at each of the times t000, t100, t200, t300, t400, t411, t500, t600, . . . .

Here, since the event data D1 has not changed at times t200, t400, and t600, the event data D1 at these times are data that need not be recorded originally. Since the time t411 is not timing of once every 100 milliseconds at which the measured data D2 and D3 should be recorded, the measured data D2 and D3 at this time t411 are also data that need not be recorded originally. Therefore, as in the case of FIG. 5, in this conventional example as well, the ring buffers actually need to have buffer sizes larger than the actual buffer size required.

In contrast, according to the embodiment in FIGS. 6 and 7, the measured data D2 and D3 are written to the second ring buffer 204-2 at the first temporal granularity (e.g., 100-millisecond time interval) and the event data D1 is written to the third ring buffer 204-3 at the second temporal granularity (e.g., timing at which the event data D1 changes) coarser than the first temporal granularity. Therefore, as in the case of the aforementioned embodiment in FIGS. 3 and 4, the overall buffer size of the ring buffer (total buffer size of the second ring buffer 204-2 and the third ring buffer 204-3) can be reduced.

Figure 9:
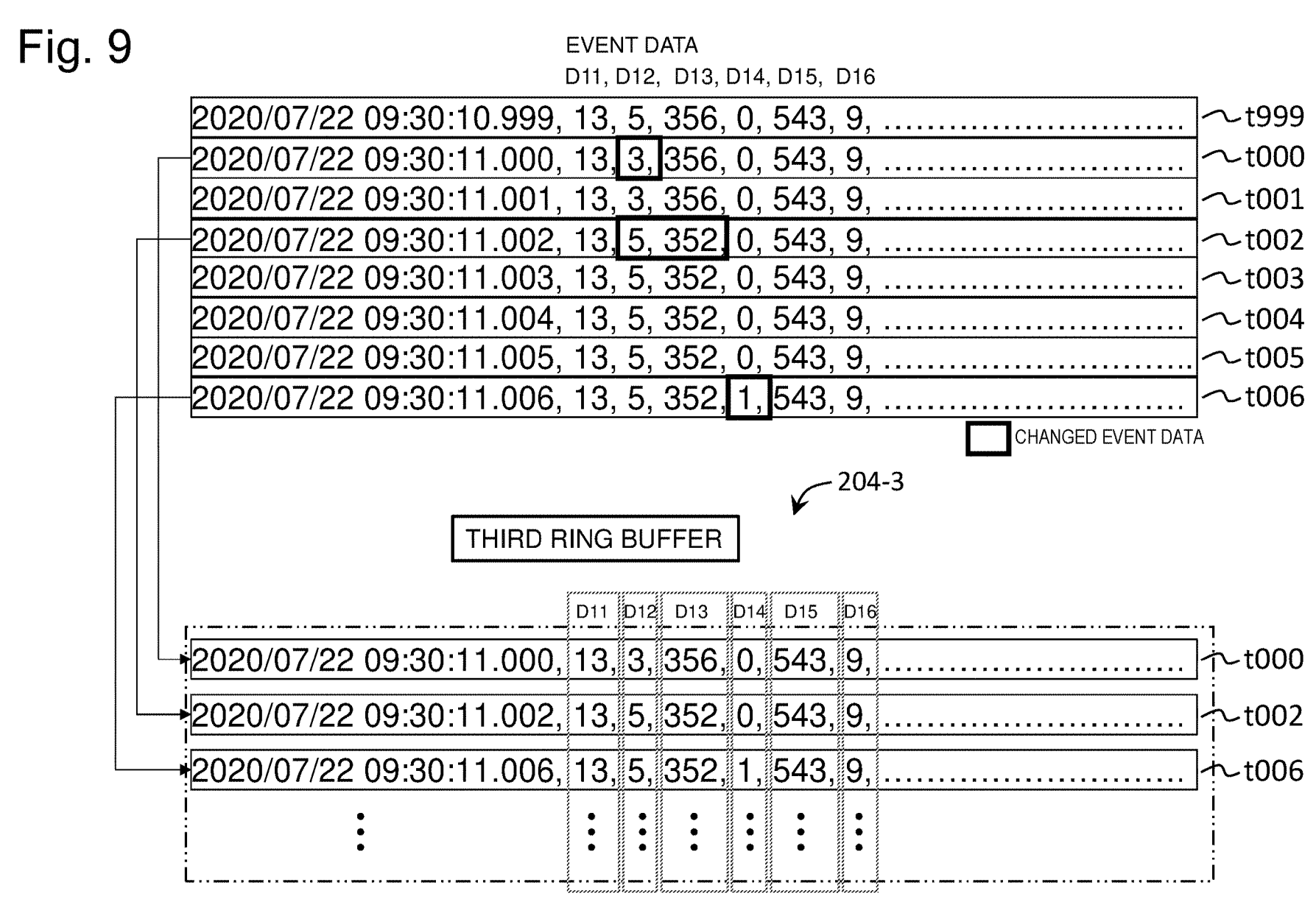

FIG. 9 is a diagram illustrating an example of a process of writing only changed event data to the third ring buffer 204-3. As shown in the upper part of FIG. 9, the processor 202 of the control device 200 generates a plurality of pieces of event data D11, D12, D13, D14, D15, D16 periodically at times t999, t000, t001, . . . , t006, . . . , which are predetermined timings and outputs an operation instruction including these event data to the drive section 120 of the semiconductor manufacturing apparatus 100. In the example in FIG. 9, although times t999, t000, t001, . . . correspond to a 1-millisecond interval, these times may correspond to any other time intervals.

Here, at time t000, event data D12 changes in value from 5 to 3, and at time t002, the event data D12 changes in value from 3 to 5. Furthermore, the event data D13 changes in value from 356 to 352, and further at time t006, the event data D14 changes in value from 0 to 1. No event data changes at other times. The processor 202 of the control device 200 writes event data D11, D12, D13, D14, D15, and D16 together with date and time information to the third ring buffer 204-3 at these times t000, t002, 1006 (, . . . )(lower part of FIG. 9). Note that although the time interval at which the event data changes is 2 milliseconds or 4 milliseconds in FIG. 9, this is just for convenience of explanation, and the event data actually changes at the second temporal granularity coarser than the first temporal granularity as described above. Although only one event data D1 is shown in aforementioned FIG. 7, it goes without saying that there can be a plurality of pieces of event data as shown in FIG. 9.

Figure 10:
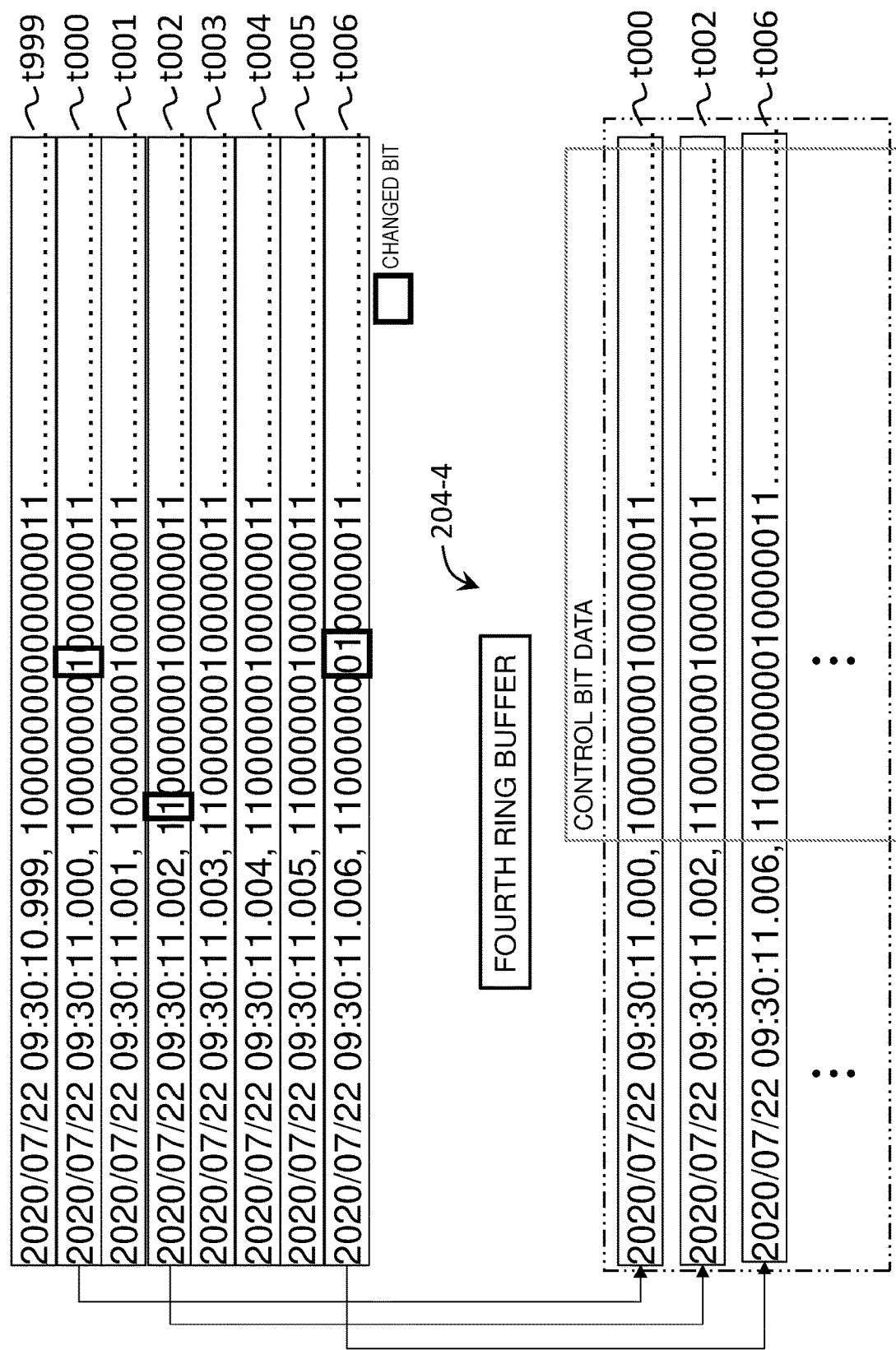
FIG. 10 is a diagram illustrating an example of a process of writing control bit data to the third ring buffer.

FIG. 10 is a diagram illustrating an example of a process of writing "control bit data" to a fourth ring buffer 204-4 using a technique similar to the technique for event data. The control bit data is data included in an operation instruction sent from the control device 200 to the semiconductor manufacturing apparatus 100 in aforementioned step S201 in FIG. 2 as in the case of the event data and is information that specifies an operating condition (e.g., on or off) of each drive section 120 or each sensor 140 of the semiconductor manufacturing apparatus 100 with bit "0" or "1." The control bit data is expressed as a bit string with a plurality of consecutive 0s and 1s, and, for example, the first bit corresponds to a sensor A, the second bit corresponds to a sensor B, the third bit corresponds to a valve C, the fourth bit corresponds to a valve D and the fifth bit corresponds to an alarming device E. For example, control bit data "10011 . . . " means operating conditions such as sensor A: measurement done, sensor B: measurement stopped, valve C: closed, valve D: open, alarming device E: alarm on.

The processor 202 of the control device 200 writes the control bit data to the fourth ring buffer 204-4 at timing when each bit changes. As shown in an upper part of FIG. 10, the processor 202 generates the control bit data periodically at, for example, times t999, t000, t001, . . . , t006, . . . , which is a 1-millisecond interval, and outputs the control bit data as an operation instruction (or part of an operation instruction) to the semiconductor manufacturing apparatus 100. Here, the control bit data has changed on the ninth bit at time t000, on the second bit at time t002 and on the ninth and tenth bits at time t006. No bit has changed at other times. The processor 202 writes the control bit data together with date and time information to the fourth ring buffer 204-4 at times t000, t002, t006 (, . . . ) (lower part of FIG. 10).

Figure 11:
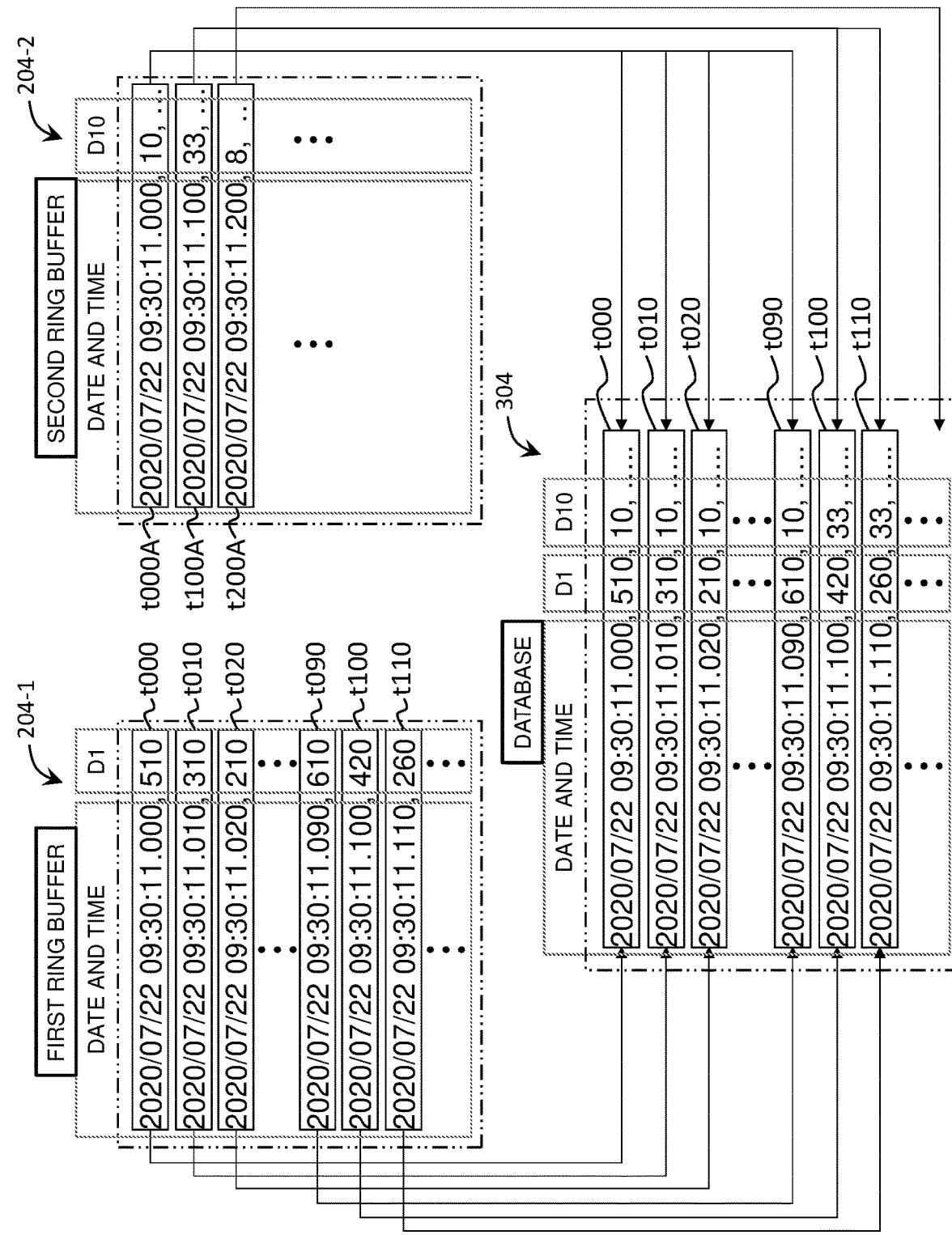
FIG. 11 is a diagram illustrating details of a process in step S205 according to the embodiment of the present invention and illustrating an example of a process of temporally matching high speed sampling data in the first ring buffer and low speed sampling data in the second ring buffer.
Figure 12:
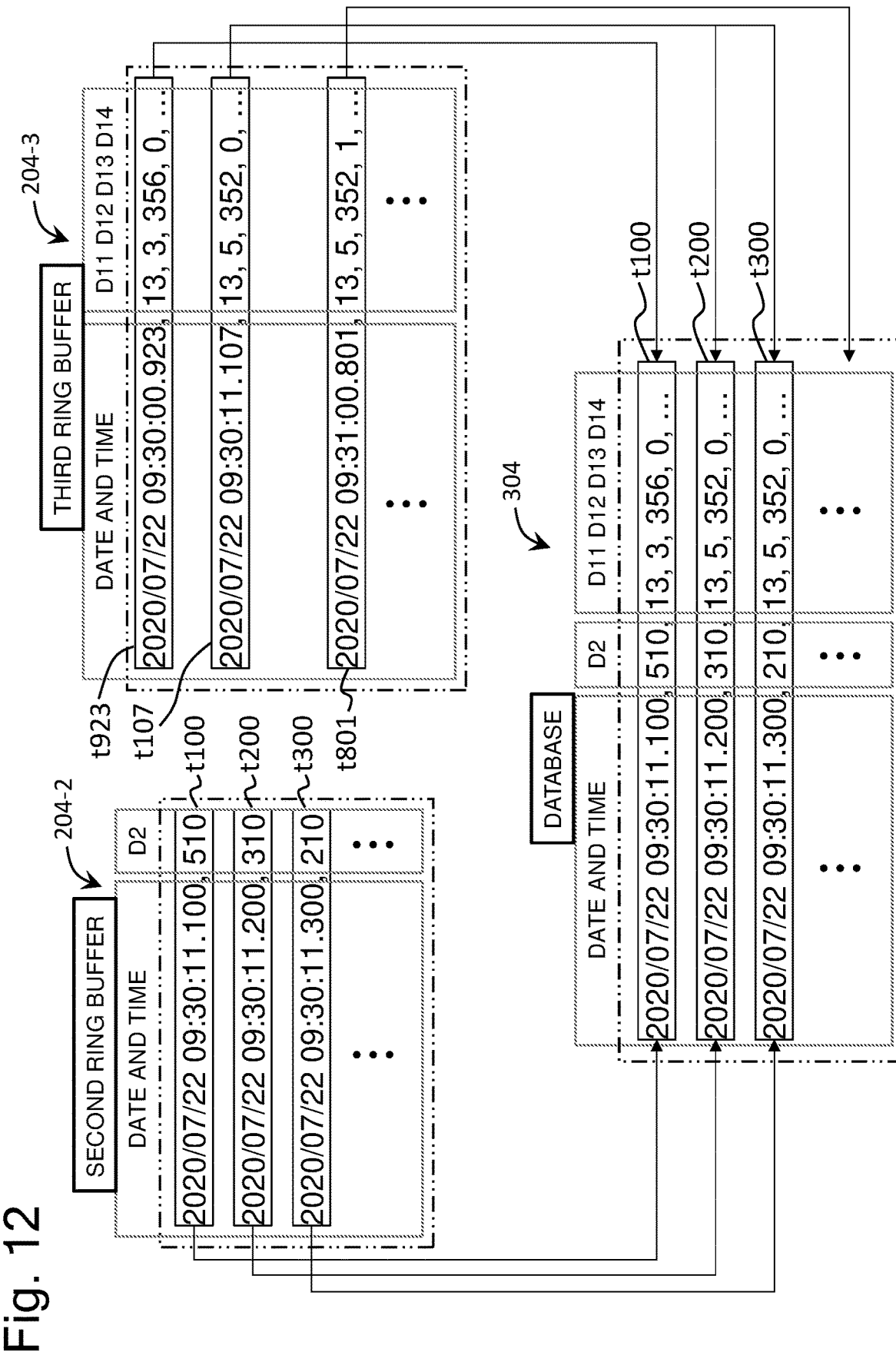
FIG. 12 is a diagram illustrating details of the process in step S205 according to the embodiment of the present invention and illustrating an example of a process of temporally matching measured data in the second ring buffer and event data in the third ring buffer.
Figure 13:
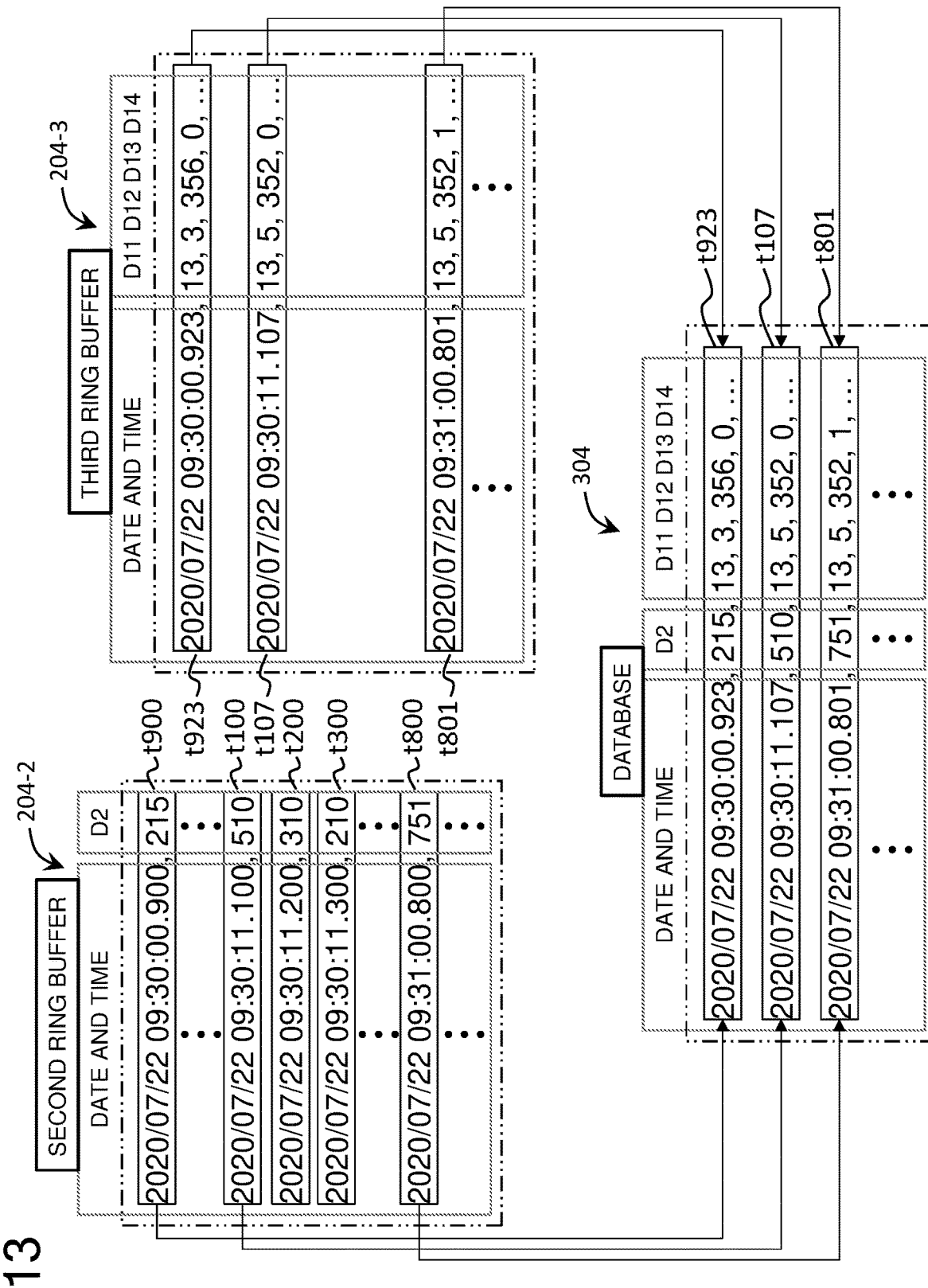
FIG. 13 is a diagram illustrating details of the process in step S205 according to the embodiment of the present invention and illustrating another example of the process of temporally matching measured data in the second ring buffer and event data in the third ring buffer.

FIGS. 11 to 13 are diagrams illustrating details of a process in step S205 of the flowchart in FIG. 2 according to the embodiment of the present invention. As described above, in step S205, the data management device 300 extracts data from the ring buffers 204-1 to 204-4 of the control device 200 and stores the data in the database 304. Here, as has been described so far, data differing in temporal granularity are held in each of the ring buffers 204-1 to 204-4. The data management device 300 stores data of the respective ring buffers 204-1 to 204-4 as they are in the database 304 and performs a process of temporally matching the data in the database 304 at an appropriate point in time (e.g., at the time of data monitoring or analysis) after that. Alternatively, prior to storing the data extracted from the respective ring buffers 204-1 to 204-4 in the database 304, the data management device 300 performs a process of temporally matching the data.

FIG. 11 illustrates an example of the process of temporally matching the high speed sampling data in the first ring buffer 204-1 with the low speed sampling data in the second ring buffer 204-2. With reference to the upper part of FIG. 11, the first ring buffer 204-1 holds high speed sampling data D1 at times t000, t010, t020, . . . , t090, t100, t110, . . . (10-millisecond interval) and the second ring buffer 204-2 holds low speed sampling data D10 at times t000A, t100A, t200A, . . . (100-millisecond interval). The processor 302 of the data management device 300 corrects date and time information of the low speed sampling data using the date and time information of the high speed sampling data (that is, data with fine temporal granularity) as a reference. The database 304 stores the low speed sampling data with the corrected date and time information in association with the high speed sampling data used as a reference for correction.

More specifically, in the example in FIG. 11 (however, it is assumed that there is a relationship: t000A≤t000 and t090<t100A≤t100), the low speed sampling data D10 at time t000A is duplicated into 10 pieces of data having the same date and time information as each high speed sampling data D1 at reference times t000, t010, t020, . . . , and t090 (that is, date and time information of the data D10 is corrected in 10 ways), these 10 pieces of duplicated low speed sampling data D10 are stored in the database 304 in association with the high speed sampling data D1 at corresponding reference times. Similarly, the low speed sampling data D10 at time t100A is duplicated into 10 pieces of data having the same date and time information as each high speed sampling data D1 at reference times t100, t110, . . . , and t190 (that is, date and time information is corrected in 10 ways), data D1 and D10 at the same date and time are associated with each other and stored in the database 304. Thus, the database 304 can hold a plurality of pieces of measured data with uniform temporal granularity. This makes it easier to monitor and analyze the measured data.

Note that the date and time information of the low speed sampling data is corrected using the date and time information of the high speed sampling data (that is, data with fine temporal granularity) as a reference in FIG. 11. On the contrary, the date and time information of the high speed sampling data may be corrected using the date and time information of the low speed sampling data (that is, data with coarse temporal granularity) as a reference (hereinafter, see an example in FIG. 13).

FIG. 12 is a diagram illustrating an example of a process of temporally matching measured data in the second ring buffer 204-2 (e.g., low speed sampling data) with event data in the third ring buffer 204-3. In the upper part of FIG. 12, the second ring buffer 204-2 holds measured data D2 at times t100, t200, t300, . . . (100-millisecond interval) and the third ring buffer 204-3 holds event data D11 to D14 at times t923, t107, t801, . . . (aperiodic). However, a relationship among the respective times is assumed to be t923<t10<t107<t200<t300<t801. As described above, the temporal granularity of the event data is normally coarser than the temporal granularity of the measured data. The processor 302 of the data management device 300 corrects the date and time information of the event data using the date and time information of the measured data (that is, data with fine temporal granularity) as a reference. The event data with corrected date and time information is stored in the database 304 in association with the measured data used as a reference for correction.

More specifically, in the example in FIG. 12, the date and time information of the event data D11 to D14 at time t923 is corrected to reference time t100, associated with the measured data D2 at the reference time 100, and stored in the database 304. On the other hand, the date and time information of the event data D11 to D14 at time t107 (since t300<t801) is corrected in two ways: reference time t200 and reference time 300 (that is, duplicated into two pieces of data differing in date and time information), associated with the measured data D2 at time t200 and time t300 respectively, and stored in the database 304. Though not shown, the same applies to event data D11 to D14 at time t801. In this way, the database 304 can hold measured data and event data with uniform temporal granularity. This makes it easier to monitor and analyze measured data and event data.

FIG. 13 is a diagram illustrating another example of the process of temporally matching the measured data in the second ring buffer 204-2 (e.g., low speed sampling data) with the event data in the third ring buffer 204-3. In the upper part of FIG. 13, the second ring buffer 204-2 holds measured data D2 at times t900, . . . , t100, t200, t300, . . . , t800, . . . (100-millisecond interval) and the third ring buffer 204-3 holds event data D11 to D14 at times t923, t107, t801, . . . (aperiodic). However, relationships among the respective times are assumed to be t900<t923<t100<t107<t200<t300<t800<t801. In contrast to the above-described case in FIG. 12, the processor 302 of the data management device 300 corrects the date and time information of measured data using the date and time information of event data (that is, data with coarse temporal granularity) as a reference. The database 304 stores the measured data with the corrected date and time information in association with the event data used as a reference for correction.

More specifically, in the example in FIG. 13, the date and time information of the measured data D2 at time t900 immediately before reference time t923 is corrected to the reference time t923, associated with the event data D11 to D14 at time t923, and stored in the database 304. Similarly, the date and time information of the measured data D2 at time t100 immediately before reference time t107 and at time t800 immediately before reference time t801 is corrected to the reference times t107 and t801 respectively, associated with each event data D11 to D14 at time t107 and t801, and stored in the database 304. Note that the measured data D2 at times t200, t300 or the like, which are not times immediately before the reference time is excluded from storage targets of the database 304 as a result of the time matching process. In this way, the database 304 can hold measured data and event data with uniform temporal granularity. This makes it easier to monitor and analyze measured data and event data.

Note that in FIG. 12 and FIG. 13, while the measured data in the second ring buffer 204-2 and the event data in the third ring buffer 204-3 are temporally matched, it is also possible to temporally match the measured data in the second ring buffer 204-2 with the control bit data in the fourth ring buffer 204-4 using a similar process.

Figure 14:
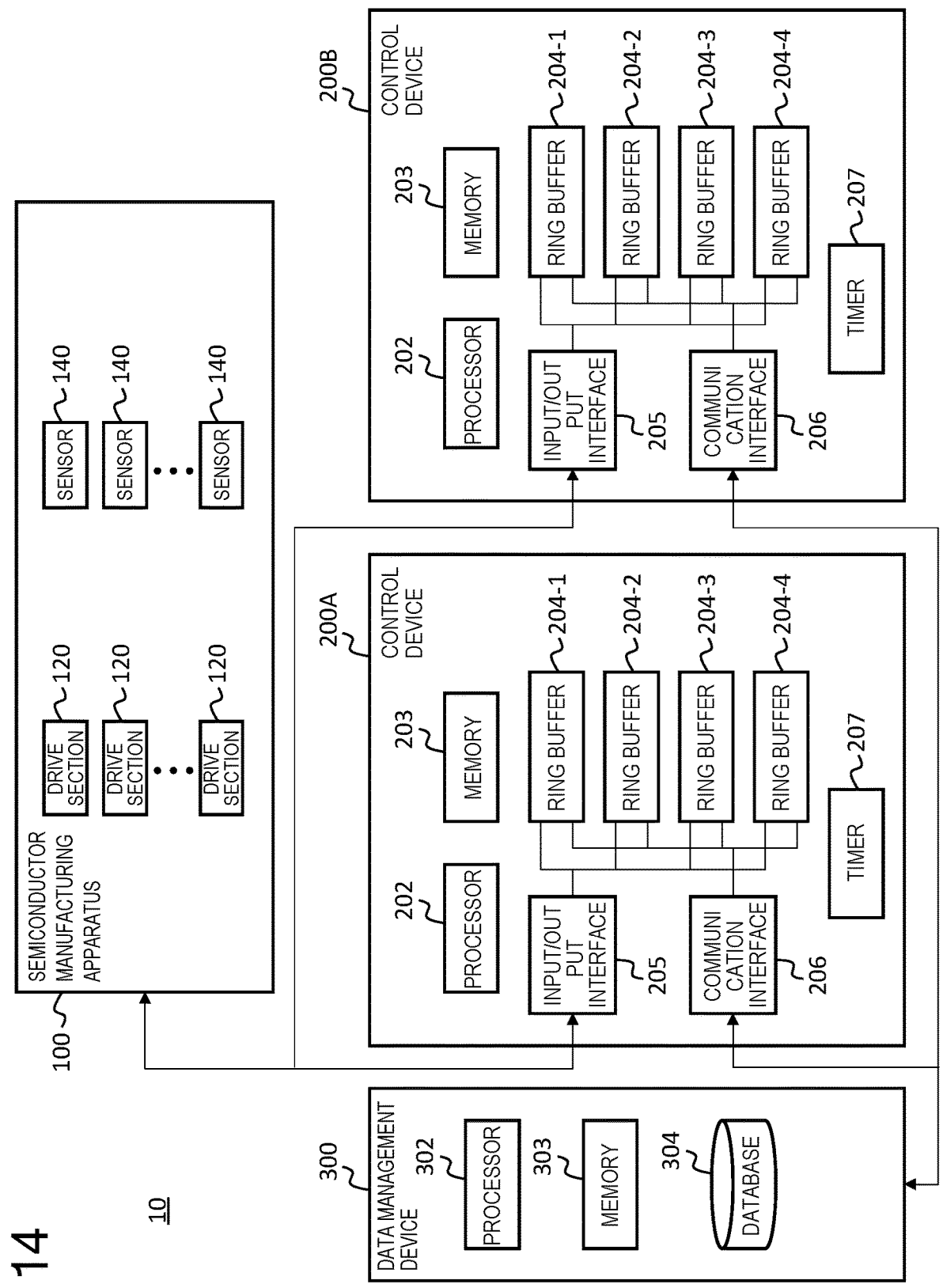
FIG. 14 is a diagram illustrating another configuration example of a system that implements the method according to the embodiment of the present invention.

FIG. 14 is a diagram illustrating another configuration example of the system 10 to implement the method according to the embodiment of the present invention. In FIG. 14, the system 10 is provided with a plurality of control devices 200. A first control device 200A is connected to some of the plurality of drive sections 120 and sensors 140 of the semiconductor manufacturing apparatus 100, and a second control device 200B is connected to some other parts of the plurality of drive sections 120 and sensors 140 of the semiconductor manufacturing apparatus 100. Functions of the respective components of the system 10 in FIG. 14 are the same as the functions of the respective components of the system 10 in FIG. 1.

Figure 15:
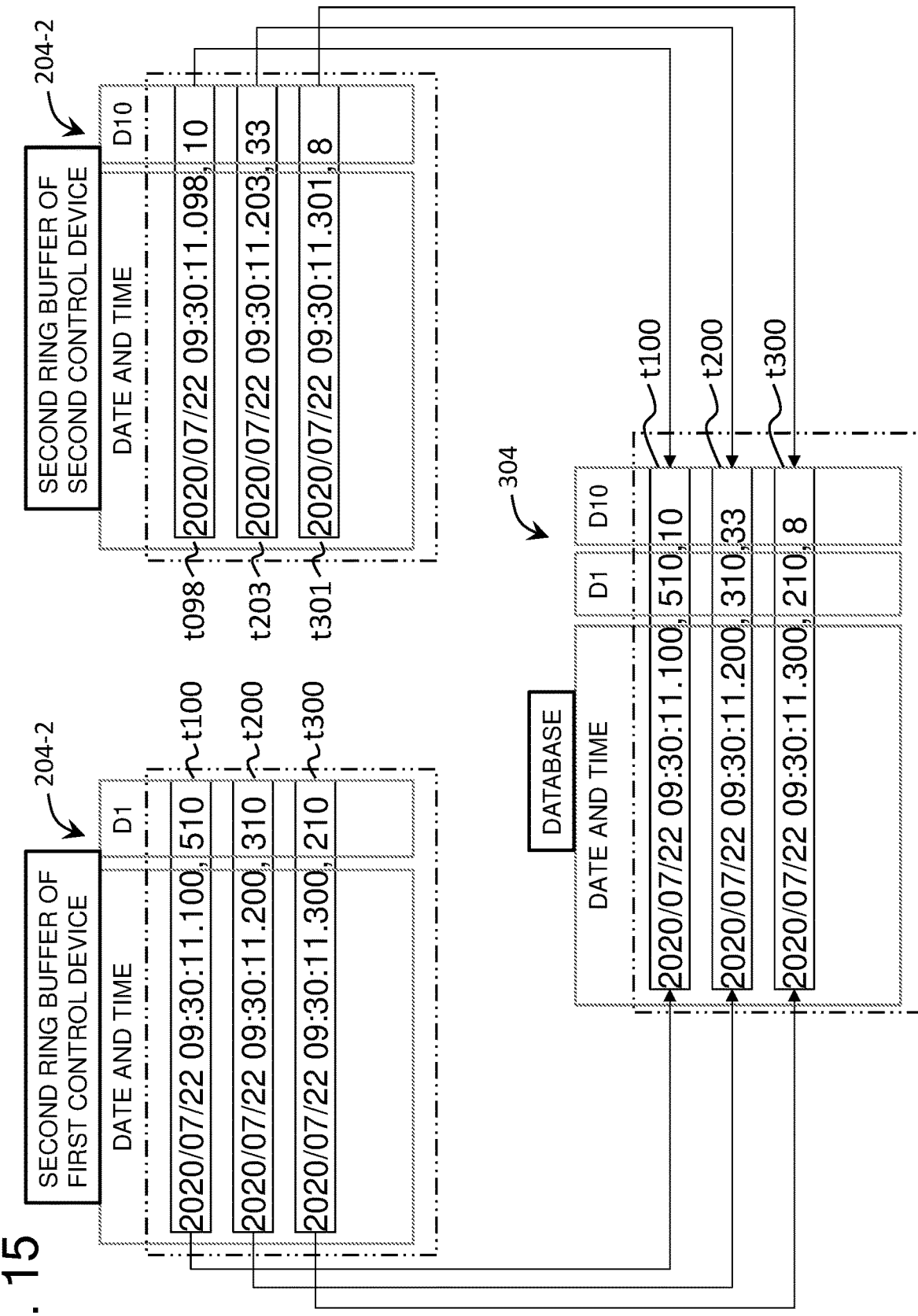
FIG. 15 is a diagram illustrating details of the process in step S205 applicable to the system in FIG. 14.

FIG. 15 is a diagram illustrating details of the process in step S205 of the flowchart in FIG. 2 applicable to the system 10 in FIG. 14. In the system 10 in FIG. 14, as described above, the first control device 200A and the second control device 200B respectively write high speed sampling data to the first ring buffer 204-1 periodically at the first temporal granularity (e.g., once every 10 milliseconds) and write low speed sampling data to the second ring buffer 204-2 periodically at the second temporal granularity (e.g., once every 100 milliseconds). Here, for example, when the time of the timer 207 of each control device 200 does not exactly match or when there is a difference in processing load among the respective control devices 200 or the like, date and time information actually stored in the first ring buffer 204-1 (or the second ring buffer 204-2) of the respective control devices 200 can be misaligned.

The data management device 300 performs the process of storing the data in the first ring buffer 204-1 (or the second ring buffer 204-2) of each control device 200 as it is in the database 304 and temporally matching the data in the database 304 at an appropriate point in time (e.g., at the time of data monitoring or analysis) after that. Alternatively, prior to storing the data extracted from the first ring buffer 204-1 (or the second ring buffer 204-2) of each control device 200 in the database 304, the data management device 300 performs the process of temporally matching the data.

For example, the processor 302 of the data management device 300 corrects the date and time information of the second control device 200B using the date and time information of the first control device 200A as a reference. The measured data of the second control device 200B with the corrected date and time information is stored in the database 304 in association with the measured data of the first control device 200A used as a reference for correction. In the example shown in FIG. 15, with the date and time information corrected to reference time t100 of the first control device 200A, the measured data D10 at time t098 of the second control device 200B is associated with the measured data D1 of the first control device 200A at the reference time t100 and stored in the database 304. The measured data D10 at times t203 and t301 of the second control device 200B are likewise stored in the database 304 after correcting the date and time information to reference times t200 and t300 of the first control device 200A respectively. Note that although the date and time information of the first control device 200A is used as a reference here, the date and time information of the second control device 200B may also be used as a reference. Which date and time information is used as a reference can be set in the data management device 300 in advance.

The time matching process described with reference to FIGS. 11 to 13 may be applicable to the system 10 provided with the plurality of control devices 200 in FIG. 14. In such a case, any one of the two ring buffers shown in FIGS. 11 to 13 may be the ring buffer of the first control device 200A and the other may be the ring buffer of the second control device 200B. For example, in the example in FIG. 11, the date and time information of the low speed sampling data held in the second ring buffer 204-2 of the second control device 200B can be corrected using the date and time information of the high speed sampling data held in the first ring buffer 204-1 of the first control device 200A as a reference. Or, on the other hand, the date and time information of the low speed sampling data held in the second ring buffer 204-2 of the first control device 200A can also be corrected using the date and time information of the high speed sampling data held in the first ring buffer 204-1 of the second control device 200B as a reference. The same is applicable to the examples in FIG. 12 and FIG. 13 as well.

Although the embodiments of the present invention have been described so far based on several examples, the aforementioned embodiments of the invention are intended to facilitate an understanding of the present invention, but not intended to limit the present invention. The present invention can be changed or improved without departing from the spirit and scope of the present invention, and it goes without saying that the present invention includes its equivalent components. Furthermore, within a scope in which at least some of the aforementioned problems can be solved or within a scope in which at least some effects can be exerted, any combination or omission of the respective components described in the claims and the specification is possible.

REFERENCE SIGNS LIST 10 system
100 semiconductor manufacturing apparatus
120 drive section
140 sensor
200 control device
202 processor
203 memory
204-1 first ring buffer
204-2 second ring buffer
204-3 third ring buffer
204-4 fourth ring buffer
205 input/output interface
206 communication interface
207 timer
300 data management device
302 processor
303 memory
304 database
400 communication wiring
500 network

What is claimed is:

1. A data management method for a semiconductor manufacturing apparatus comprising a plurality of sensors configured to measure operation of the semiconductor apparatus, the method comprising:
    acquiring, by a control device, data related to operation of the semiconductor manufacturing apparatus;
    identifying, by the control device, first data indicative of measured values collected from at least one of the plurality of sensors and second data of the acquired data;
    writing, by the control device, the first data to a first ring buffer at first temporal granularity and the second data to a second ring buffer at second temporal granularity coarser than the first temporal granularity, wherein the second temporal granularity is based on the second data being written to the second ring buffer based on an aperiodic event time causing a change in the second data and wherein the first temporal granularity is based on a sensor measurement sampling time; and
    extracting, by a data management device, the first and second data from the first ring buffer and the second ring buffer respectively and storing the first and second data in a database.

2. The data management method according to claim 1, wherein the first data and the second data are written to the first ring buffer and the second ring buffer periodically at the first temporal granularity and the second temporal granularity respectively.

3. The data management method according to claim 1, wherein
    the step of storing the first and second data in the database comprises:
    correcting time information of the second data using time information of the first data as a reference; and
    storing the second data with the corrected time information in the database in association with the first data used as the reference for the time information.

4. The data management method according to claim 3, wherein one piece of the second data is associated with a plurality of pieces of the first data.

5. The data management method according to claim 1, wherein the step of storing the first and second data in the database comprises:
    correcting time information of the first data using time information of the second data as a reference; and
    storing the first data with the corrected time information in the database in association with the second data used as the reference for the time information.

6. The data management method according to claim 5, wherein a selected one of the plurality of pieces of the first data is associated with one piece of the second data.

7. The data management method according to claim 1, wherein the first data and the second data are measured data measured by a sensor provided in the semiconductor manufacturing apparatus.

8. The data management method according to claim 1, wherein
the first data is measured data measured by a sensor provided in the semiconductor manufacturing apparatus, and
the second data is data indicating operation contents of the semiconductor manufacturing apparatus.

9. A data management method for a semiconductor manufacturing apparatus comprising a plurality of sensors configured to measure operation of the semiconductor apparatus, the method comprising:
acquiring, by a first control device, first data related to operation of the semiconductor manufacturing apparatus and indicative of measured values collected from at least one of the plurality of sensors;
acquiring, by a second control device, second data related to operation of the semiconductor manufacturing apparatus;
writing, by the first control device, the first data to a first ring buffer at first temporal granularity wherein the first temporal granularity is based on a sensor measurement sampling time;
writing, by the second control device, the second data in a second ring buffer at second temporal granularity coarser than the first temporal granularity wherein the second temporal granularity is based on an aperiodic event time causing a change in the second data;
extracting, by a data management device, the first and second data from the first ring buffer and the second ring buffer respectively;
correcting, by the data management device, time information of the second data using time information of the first data as a reference; and
storing, by the data management device, the second data with the corrected time information in a database in association with the first data used as a reference for the time information.

10. A control device connected to a semiconductor manufacturing apparatus, the control device comprising:
a plurality of sensors configured to measure operation of the semiconductor apparatus
a first ring buffer; and
a second ring buffer, wherein the control device is configured to:
acquire data related to operation of the semiconductor manufacturing apparatus;
identify first data indicative of measured values collected from at least one of the plurality of sensors and second data in the acquired data;
write the first data to a first ring buffer at first temporal granularity wherein the first temporal granularity is based on a sensor measurement sampling time; and
write the second data to a second ring buffer at second temporal granularity coarser than the first temporal granularity wherein the second temporal granularity is based on an aperiodic event time causing a change in the second data.

* * * * *